United States Patent
Hsu et al.

(10) Patent No.: US 11,290,148 B2
(45) Date of Patent: Mar. 29, 2022

(54) OPERATION METHOD AND RECEIVER DEVICE

(71) Applicant: Realtek Semiconductor Corporation, Hsinchu (TW)

(72) Inventors: Chi-Sheng Hsu, Hsinchu (TW); Sung-Yen Mao, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 27 days.

(21) Appl. No.: 17/034,288

(22) Filed: Sep. 28, 2020

(65) Prior Publication Data

US 2021/0266035 A1 Aug. 26, 2021

(30) Foreign Application Priority Data

Feb. 20, 2020 (TW) ................. 109105529

(51) Int. Cl.
*H04B 3/23* (2006.01)
*H04L 25/03* (2006.01)
*H04L 25/02* (2006.01)

(52) U.S. Cl.
CPC ......... *H04B 3/231* (2013.01); *H04L 25/0202* (2013.01); *H04L 25/0272* (2013.01); *H04L 25/03878* (2013.01)

(58) Field of Classification Search
CPC . H04B 3/231; H04L 25/0202; H04L 25/0272; H04L 25/03878
See application file for complete search history.

(56) References Cited

U.S. PATENT DOCUMENTS

| | | | | |
|---|---|---|---|---|
| 3,578,914 A | * | 5/1971 | Simonelli | H04L 25/03878 370/284 |
| 4,839,905 A | * | 6/1989 | Mantovani | H04L 25/03019 333/18 |
| 5,519,727 A | * | 5/1996 | Okanoue | H04L 1/20 375/231 |
| 5,664,116 A | * | 9/1997 | Gaytan | H04Q 11/0478 709/234 |
| 5,856,980 A | * | 1/1999 | Doyle | H03M 5/20 714/704 |
| 5,872,823 A | * | 2/1999 | Sutton | H04L 1/22 375/372 |
| 5,946,351 A | * | 8/1999 | Ariyavisitakul | H04L 25/03057 375/233 |
| 6,038,269 A | * | 3/2000 | Raghavan | H04L 25/03178 375/340 |

(Continued)

FOREIGN PATENT DOCUMENTS

| | | |
|---|---|---|
| CN | 1784586 A | 6/2006 |
| TW | 201037329 A | 10/2010 |

(Continued)

*Primary Examiner* — James M Perez
(74) *Attorney, Agent, or Firm* — Locke Lord LLP; Tim Tingkang Xia, Esq.

(57) ABSTRACT

An operation method is implemented by a receiver device. The operation method includes following steps: detecting a signal on a transmission line; performing a channel estimation to acquire a length of the transmission line; comparing the length with at least one length threshold value to generate a comparison result; and adjusting a depth of a FIFO process according to the comparison result.

18 Claims, 6 Drawing Sheets

(56) References Cited

U.S. PATENT DOCUMENTS

| | | | | |
|---|---|---|---|---|
| 6,094,726 A * | 7/2000 | Gonion | G06F 15/7867 | 713/400 |
| 6,122,252 A * | 9/2000 | Aimoto | H04L 12/5602 | 370/235 |
| 6,185,251 B1 * | 2/2001 | Fertner | H04L 25/0202 | 375/229 |
| 6,249,544 B1 * | 6/2001 | Azazzi | G01R 31/3004 | 375/229 |
| 6,249,756 B1 * | 6/2001 | Bunton | G06F 5/06 | 370/414 |
| 6,304,615 B1 * | 10/2001 | Webster | H04L 25/03878 | 375/319 |
| 6,317,495 B1 * | 11/2001 | Gaikwad | H04L 5/14 | 370/201 |
| 6,377,640 B2 * | 4/2002 | Trans | H04B 1/00 | 370/286 |
| 6,415,003 B1 * | 7/2002 | Raghavan | H04L 25/061 | 327/307 |
| 6,438,163 B1 * | 8/2002 | Raghavan | H03G 3/3052 | 324/617 |
| 6,480,477 B1 * | 11/2002 | Treadaway | H04L 1/0003 | 370/314 |
| 6,539,031 B1 * | 3/2003 | Ngoc | H04L 12/413 | 370/470 |
| 6,581,164 B1 * | 6/2003 | Felts, III | H04N 21/4305 | 713/400 |
| 6,665,285 B1 * | 12/2003 | Treadaway | H04L 12/4604 | 370/338 |
| 6,687,286 B1 * | 2/2004 | Leonowich | H04L 25/4904 | 375/219 |
| 6,731,333 B2 * | 5/2004 | Sung | G08B 13/1963 | 348/151 |
| 6,741,644 B1 * | 5/2004 | Dehghan | H03H 17/0294 | 375/229 |
| 6,782,043 B1 * | 8/2004 | Dehghan | H04B 3/46 | 375/133 |
| 6,823,028 B1 * | 11/2004 | Phanse | H03G 3/001 | 375/345 |
| 6,907,048 B1 * | 6/2005 | Treadaway | H04L 47/10 | 370/474 |
| 6,933,964 B2 * | 8/2005 | Sung | H04N 7/185 | 348/143 |
| 6,943,925 B1 * | 9/2005 | Islam | G02B 6/3516 | 359/108 |
| 6,980,644 B1 * | 12/2005 | Sallaway | H04M 9/082 | 379/391 |
| 6,985,451 B1 * | 1/2006 | Nattiv | H04L 5/14 | 370/277 |
| 7,006,563 B2 * | 2/2006 | Allpress | H04L 25/03057 | 375/229 |
| 7,050,517 B1 * | 5/2006 | Sallaway | H04B 3/23 | 375/350 |
| 7,069,165 B2 * | 6/2006 | Rosenberg | H04M 3/305 | 702/85 |
| 7,203,256 B2 * | 4/2007 | Lin | H04L 25/022 | 375/340 |
| 7,230,983 B2 * | 6/2007 | Yousef | H04L 25/0202 | 375/232 |
| 7,254,198 B1 * | 8/2007 | Manickam | H04L 25/03057 | 375/233 |
| 7,292,629 B2 * | 11/2007 | Zerbe | H04L 25/03038 | 375/229 |
| 7,388,909 B2 * | 6/2008 | Lin | H04L 25/03146 | 375/222 |
| 7,526,023 B1 * | 4/2009 | Shumarayev | H04L 25/03057 | 375/233 |
| 7,548,596 B2 * | 6/2009 | Yen | H04L 25/0216 | 375/340 |
| 7,570,307 B2 * | 8/2009 | Iha | G06T 5/002 | 348/624 |
| 7,599,456 B1 * | 10/2009 | Chi | H03F 3/217 | 370/232 |
| 7,813,495 B1 * | 10/2010 | Ziazadeh | H04L 25/0272 | 379/398 |
| 7,831,005 B2 * | 11/2010 | Kuwata | H04L 7/0091 | 375/371 |
| 7,873,953 B1 * | 1/2011 | Pritchard | G06F 8/443 | 717/154 |
| 8,228,074 B2 * | 7/2012 | Lin | H04L 43/50 | 324/642 |
| 8,462,880 B2 * | 6/2013 | Lin | H04B 3/30 | 375/296 |
| 8,483,309 B2 * | 7/2013 | Gernegross | H04Q 11/04 | 375/285 |
| 8,675,714 B2 * | 3/2014 | Cheung | H04B 3/466 | 375/214 |
| 8,699,555 B2 * | 4/2014 | Tan | H04L 25/03012 | 375/232 |
| 8,891,601 B2 * | 11/2014 | Huang | H04B 3/23 | 375/222 |
| 9,008,168 B2 * | 4/2015 | Miller | H04N 5/268 | 375/232 |
| 9,136,905 B2 * | 9/2015 | Lou | H04B 3/20 | |
| 9,312,916 B2 * | 4/2016 | Dardenne | H04B 3/48 | |
| 9,664,496 B2 * | 5/2017 | Zhang | H04B 3/46 | |
| 9,736,086 B1 * | 8/2017 | Ngo | H04L 47/6245 | |
| 9,768,993 B2 * | 9/2017 | Minami | H04L 25/03878 | |
| 9,787,505 B2 * | 10/2017 | Lim | H04L 25/0272 | |
| 9,900,121 B1 * | 2/2018 | Takatori | H04L 25/03057 | |
| 10,158,336 B2 * | 12/2018 | Blatz | H03G 3/3084 | |
| 10,225,147 B2 * | 3/2019 | Ginis | H04L 41/0896 | |
| 10,461,918 B2 * | 10/2019 | Kobayashi | H04L 7/041 | |
| 2001/0038674 A1 * | 11/2001 | Trans | H04L 7/0008 | 375/355 |
| 2001/0043647 A1 * | 11/2001 | Belge | H04M 3/2227 | 375/222 |
| 2002/0057101 A1 * | 5/2002 | Tang | H04L 25/03878 | 326/29 |
| 2002/0150107 A1 * | 10/2002 | Aronson | H04L 49/9078 | 370/395.53 |
| 2002/0154248 A1 * | 10/2002 | Wittig | H04L 1/0054 | 348/614 |
| 2002/0176482 A1 * | 11/2002 | Chien | H04L 1/0025 | 375/132 |
| 2003/0001666 A1 * | 1/2003 | Watanabe | H03K 5/19 | 327/563 |
| 2003/0152173 A1 * | 8/2003 | Strolle | H04B 7/0848 | 375/347 |
| 2003/0161348 A1 * | 8/2003 | Mills | H04L 12/12 | 370/509 |
| 2003/0174022 A1 * | 9/2003 | Zamir | H03F 3/191 | 330/253 |
| 2003/0234860 A1 * | 12/2003 | Sung | H04N 7/185 | 348/143 |
| 2003/0234861 A1 * | 12/2003 | Sung | G08B 13/1963 | 348/143 |
| 2004/0066755 A1 * | 4/2004 | Lin | H04L 25/022 | 370/252 |
| 2004/0096004 A1 * | 5/2004 | Wang | H04L 25/03885 | 375/257 |
| 2004/0105504 A1 * | 6/2004 | Chan | H04B 3/23 | 375/257 |
| 2004/0179589 A1 * | 9/2004 | Yousef | H04L 25/03057 | 375/233 |
| 2005/0041727 A1 * | 2/2005 | Agazi | H04L 25/4917 | 375/219 |
| 2005/0041746 A1 * | 2/2005 | Rosen | H04B 1/7163 | 375/242 |
| 2006/0146945 A1 * | 7/2006 | Chow | H04L 25/03159 | 375/260 |
| 2006/0182171 A1 * | 8/2006 | Kuijk | H04B 3/141 | 375/229 |
| 2006/0238237 A1 * | 10/2006 | Clements | H04L 25/03885 | 327/557 |
| 2007/0014393 A1 * | 1/2007 | Jensen | H04B 3/46 | 379/30 |
| 2007/0103204 A1 * | 5/2007 | Egan | H03K 19/0175 | 327/100 |

(56) References Cited

U.S. PATENT DOCUMENTS

| | | | |
|---|---|---|---|
| 2007/0201583 A1* | 8/2007 | Yen | H04L 25/022 375/340 |
| 2007/0237468 A1* | 10/2007 | Aronson | G02B 6/4284 385/100 |
| 2008/0008233 A1* | 1/2008 | Cohen | H04L 25/0212 375/232 |
| 2009/0052509 A1* | 2/2009 | Agazzi | H04L 25/03146 375/219 |
| 2009/0086846 A1* | 4/2009 | Erden | H04L 25/06 375/295 |
| 2009/0128239 A1* | 5/2009 | Kuijk | H04L 25/03878 330/254 |
| 2009/0245333 A1* | 10/2009 | Krishnamoorthi | H04L 25/0202 375/219 |
| 2010/0054315 A1* | 3/2010 | Huang | H04B 3/32 375/222 |
| 2010/0208849 A1* | 8/2010 | Grosskinsky | H04L 25/4904 375/340 |
| 2010/0259244 A1* | 10/2010 | Lin | H04L 43/50 324/71.1 |
| 2011/0032976 A1* | 2/2011 | Hou | H04B 3/238 375/226 |
| 2012/0269101 A1* | 10/2012 | Vexler | H04L 5/1423 370/276 |
| 2013/0034143 A1* | 2/2013 | Acosta-Serafini | H04L 25/03878 375/232 |
| 2013/0142244 A1* | 6/2013 | Tan | H04L 25/03159 375/232 |
| 2013/0243183 A1* | 9/2013 | Lou | H04B 3/20 379/406.01 |
| 2014/0146867 A1* | 5/2014 | Shvydun | H04L 25/03885 375/233 |
| 2015/0054488 A1* | 2/2015 | Zhang | G01B 7/02 324/76.11 |
| 2016/0056905 A1* | 2/2016 | Hartlmueller | H04J 3/0697 375/354 |
| 2020/0280329 A1* | 9/2020 | Lam | H04L 1/004 |
| 2020/0280458 A1* | 9/2020 | Lam | H04L 25/03885 |
| 2021/0013998 A1* | 1/2021 | Sun | H04L 25/4917 |
| 2021/0266035 A1* | 8/2021 | Hsu | H04L 25/0202 |

FOREIGN PATENT DOCUMENTS

| | | |
|---|---|---|
| TW | 201106671 A | 2/2011 |
| WO | 2013163798 A1 | 11/2013 |

* cited by examiner

OPERATION METHOD AND RECEIVER DEVICE

RELATED APPLICATIONS

This application claims priority to Taiwanese Application Serial Number 109105529, filed Feb. 20, 2020, which is herein incorporated by reference.

BACKGROUND

Technical Field

The present disclosure relates to an operation method and a receiver device. More particularly, the present disclosure relates to an operation method and a receiver device for establishing dynamic depth adjustment to a FIFO process.

Description of Related Art

With developments of the transmission network, electrical devices can transmit/receive signals via transmission networks. Transmission lines with different lengths are required in different applications. When a receiver is configured to process signals from transmission lines with different lengths, the receiver can introduce longer delay time into the signals so that the accuracy for the receiver to receive signals from longer transmission lines can be ensured. However, in a case with shorter transmission lines, it may introduce unnecessary delay time into the signal and reduce the processing speed of the receiver.

SUMMARY

Some aspects of the present disclosure are to provide an operation method. The operation method is implemented by a receiver device. The operation method includes following steps: detecting a signal on a transmission line; performing a channel estimation to acquire a length of the transmission line; comparing the length with at least one length threshold value to generate a comparison result; and adjusting a depth of a FIFO process according to the comparison result.

Some aspects of the present disclosure are to provide a receiver device. The receiver device includes a decoder circuit, a first storage circuit, a first equalizer, a second storage circuit, a second equalizer, a canceller circuit, and a switch. The first storage circuit is configured to receive first input data and perform a FIFO process. The first equalizer is coupled to the first storage circuit and the decoder circuit. The second storage circuit is configured to receive second input data. The second equalizer is coupled to the second storage circuit and the decoder circuit. The canceller circuit is coupled to the first equalizer and the second storage circuit. The switch is coupled between an input terminal of the first storage circuit and an output terminal of the first storage circuit. The switch is turned on or turned off based on a comparison result of comparing a length of a transmission line corresponding to the first input data with at least one length threshold value.

Some aspects of the present disclosure are to provide an operation method. The operation method is implemented by a receiver device. The operation method includes following steps: detecting a signal on a transmission line; acquiring a length of the transmission line or a signal-to-noise ratio corresponding to the transmission line; determining an adjusted depth according to the length or the signal-to-noise ratio based on a look-up table; and performing a FIFO process according to the adjusted depth.

Based on the descriptions above, the receiver device and the operation method of the present disclosure can avoid introducing unnecessary delay time into the signal from the shorter transmission line and expedite the processing speed of the receiver device.

DETAILED DESCRIPTION

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may refer to "electrically connected" or "electrically coupled." "Connected" or "coupled" may also refer to operations or actions between two or more elements.

Figure 1:
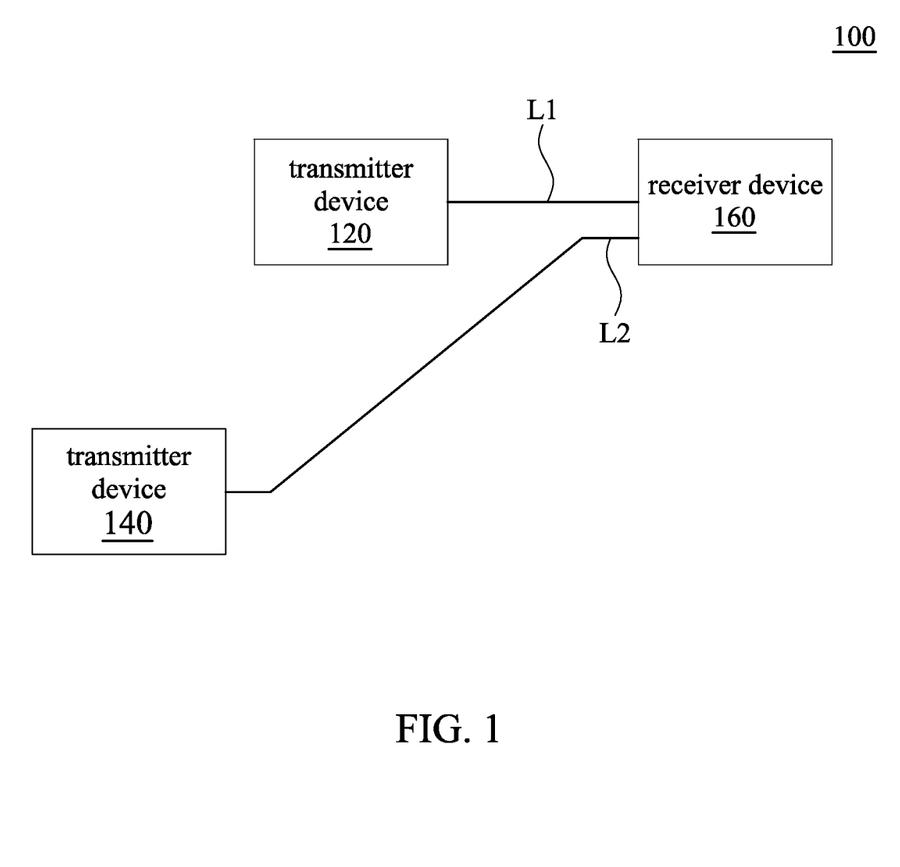
FIG. 1 is a schematic diagram illustrating a communication system according to some embodiments of the present disclosure.

Reference is made to FIG. 1. FIG. 1 is a schematic diagram illustrating a communication system 100 according to some embodiments of the present disclosure. As illustrated in FIG. 1, the communication system 100 includes a transmitter device 120, a transmitter device 140, and a receiver device 160.

The quantity of the transmitter device or the quantity of the receiver device in FIG. 1 is for illustration, and various quantities of the transmitter device or various quantities of the receiver device are within the contemplated scopes of the present disclosure.

In some embodiments, the transmitter device 120 and the transmitter device 140 can transmit signals to the receiver device 160 by wire communication technology. For example, the transmitter device 120 can transmit a signal to the receiver device 160 via a transmission line L1, and the transmitter device 140 can transmit a signal to the receiver device 160 via a transmission line L2. In some embodiments, the communication system 100 is an Ethernet system, and the transmission line L1 and the transmission line L2 are twisted pair, but the present disclosure is not limited thereto. In some embodiments, if the transmitter device 120 and the transmitter device 140 are applied to different applications, a length of the transmission line L1 may be different from a length of the transmission line L2. As illustrated in FIG. 1, the length of the transmission line L1 is shorter the length of the transmission line L2.

Figure 2:
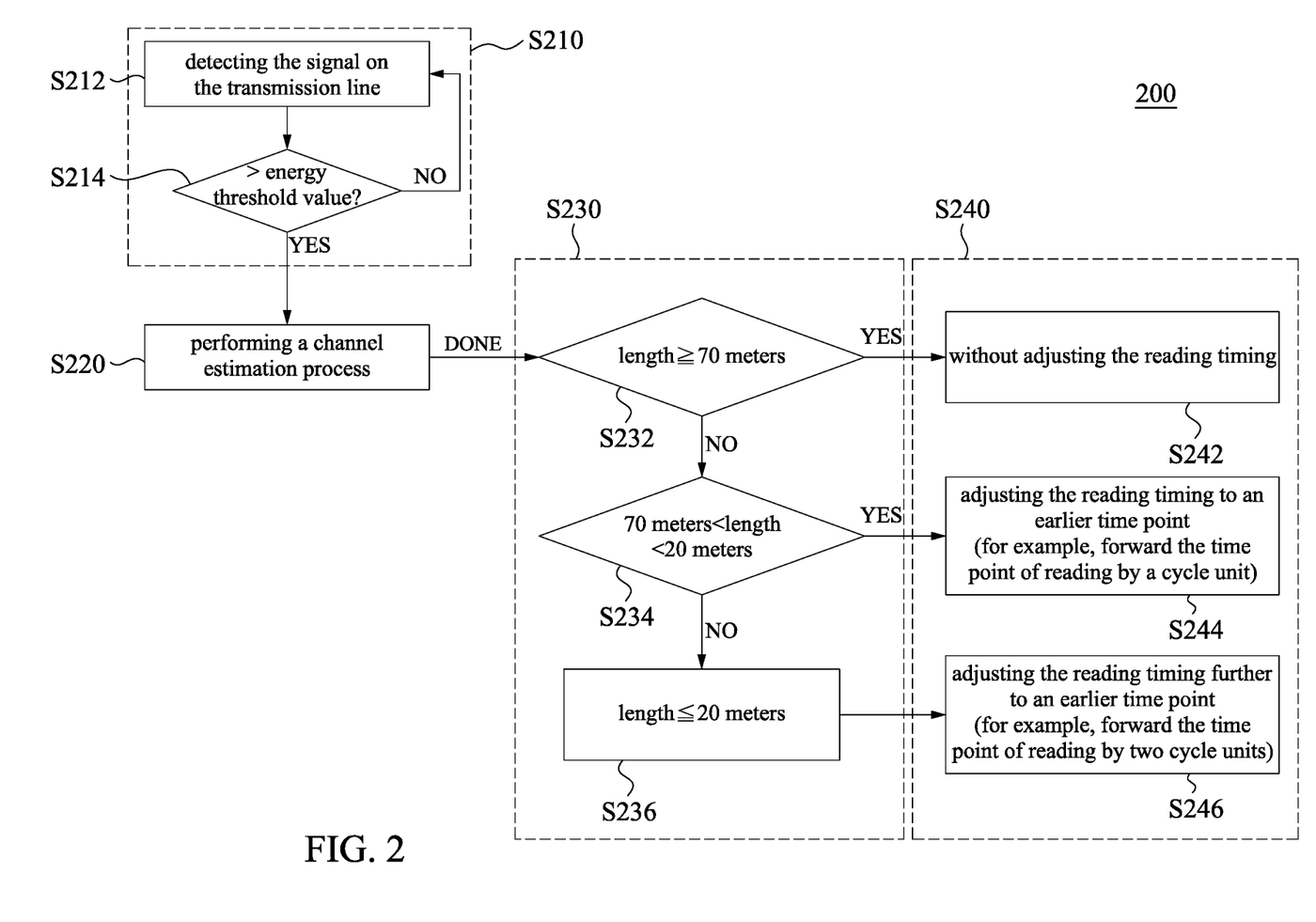
FIG. 2 is a flow diagram illustrating an operation method according to some embodiments of the present disclosure.
Figure 3:
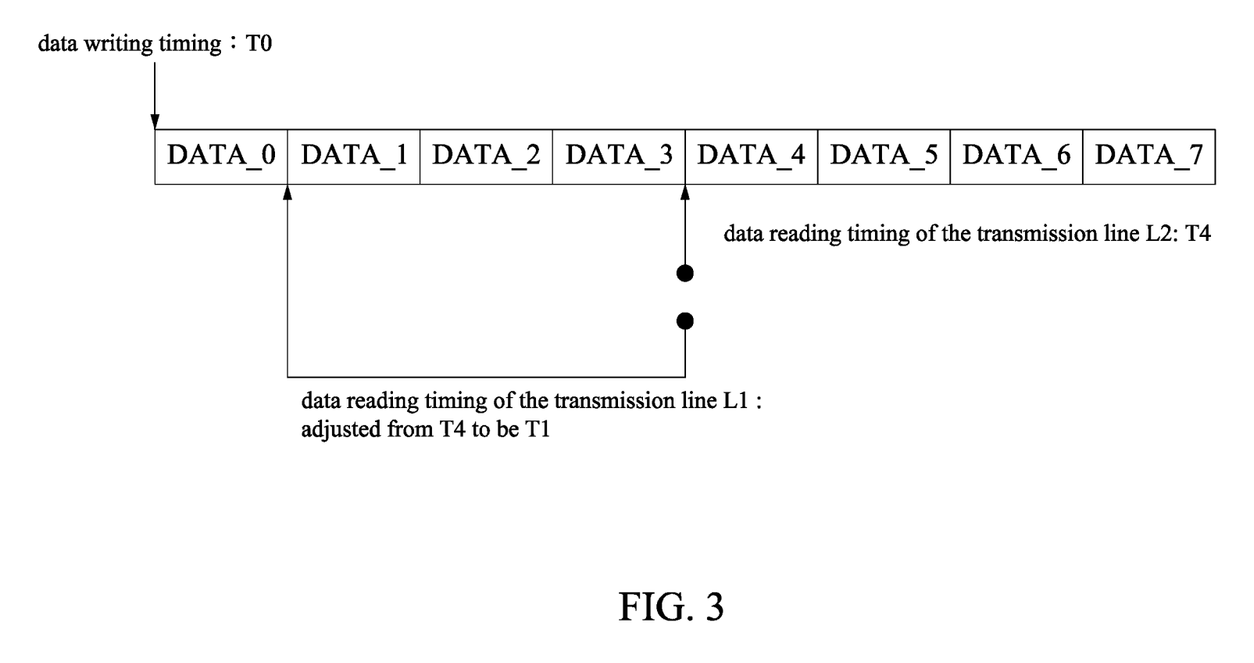
FIG. 3 is a schematic diagram illustrating adjusting reading timing in FIG. 2 according to some embodiments of the present disclosure.

Reference is made to FIG. 2. FIG. 2 is a flow diagram illustrating an operation method 200 according to some embodiments of the present disclosure. The operation method 200 includes operations S210, S220, S230, and S240. Operation S210 includes operations S212 and S214. Operation S230 includes operations S232, S234, and S236. Operation S240 includes operations S242, S244, and S246. In some embodiments, the operation method 200 is applied to the receiver device 160 in FIG. 1, but the present disclosure is not limited thereto. For ease of understanding, the operation method 200 is discussed with reference to FIG. 1 and FIG. 3. FIG. 3 is a schematic diagram illustrating adjusting reading timing in FIG. 2 according to some embodiments of the present disclosure.

In some embodiments, the receiver device 160 performs an initialization process as a first step to set a depth of a first-in-first-out (FIFO) process as a maximum depth. A value of the maximum depth may be determined according to an experiment result or an application environment (for example, an Ethernet system), and the maximum depth can ensure that the receiver device 160 is able to receive a signal on the longest transmission line (for example, the transmission line L2 in FIG. 1) accurately in the application environment. As illustrated in FIG. 3, a data stream passing through the transmission line L1 or the transmission line L2 includes data DATA_0-DATA_7. The data DATA_0 is received by the receiver device 160 at a time point T0. It is assumed that, when the FIFO process has the maximum depth, the receiver device 160 reads data at a time point T4. Based on the descriptions above, reading the data with the maximum depth (i.e. at the time point T4) can ensure that the receiver device 160 receives the signal from the longest transmission line L2 accurately in the communication system 100. However, when it comes to the shorter transmission line L1, the maximum depth may introduce unnecessary delay time and reduce the processing speed of the receiver device 160.

Based on the descriptions above, the shorter transmission line L1 is taken as an example to describe the operation method 200. Operation 3212 is detecting the signal on the transmission line L1. For example, energy of the signal on the transmission line L1 can be detected in this operation. Operation S214 is determining whether the signal energy is greater than an energy threshold value. If the result of operation S214 is YES, it determines that the signal is received accurately and enters operation S220. If the result of operation S214 is NO, its returns to the operation S212 to detect the signal energy on the transmission line L1.

Operation S220 is performing a channel estimation process. In some embodiments, the channel estimation process is performed when the FIFO process has the maximum depth. Thus, accuracy of the channel estimation result can be ensured. After the channel estimation is done, the receiver device 160 can acquire the length of the transmission line L1.

Operation S230 is comparing the transmission line L1 with at least one length threshold value to generate a comparison result. Operation S240 is adjusting the depth of the FIFO process according to the comparison result. As illustrated in FIG. 2, the length of the transmission line L1 may be compared with two length threshold values. The two length threshold values are, for example but not limited to, 70 meters and 20 meters respectively. Various suitable values are within the contemplated scopes of the present disclosure. Operation S232 is determining whether the length of the transmission line L1 is longer than or equal to 70 meters. If the result of operation S232 is YES, it enters operation S242. In operation S242, the reading timing is not adjusted. In other words, when a transmission line is longer, the reading timing is kept so that the FIFO process can be performed with the maximum depth, such that the receiver device 160 can receive the signal from the longer transmission line accurately. If the result of operation S232 is NO, it enters operation S234. Operation S234 is determining whether the length of the transmission line L1 is shorter than 70 meters and longer than 20 meters. If the result of operation S234 is YES, it enters operation S244. Operation S244 is adjusting the reading timing to an earlier time point (for example, forward the time point of reading by a cycle unit). In other words, the depth of the FIFO process is shortened. Thus, it can avoid introducing unnecessary delay time into the signal from the shorter transmission line. If the result of operation S234 is NO, it enters operation S236. Operation S236 is determining that the length of the transmission line L1 is shorter than or equal to 20 meters. Then, it enters operation S246. Operation S246 is adjusting the reading timing further to an earlier time point (for example, forward the time point of reading by two cycle units). In other words, the depth of the FIFO process can be shorter. Thus, it can avoid introducing unnecessary delay time into the signal from the shorter transmission line. As illustrated in FIG. 3, the reading timing can be moved to the time point T1. Thus, the receiver device 160 can receive the signal from the transmission line L2 accurately, and it can avoid introducing unnecessary delay time into the signal from the transmission line L1.

Based on the descriptions above, the operation method 200 can be operated by utilize the current hardware structure with new algorithms. Accordingly, it can avoid introducing higher hardware costs.

Figure 4:
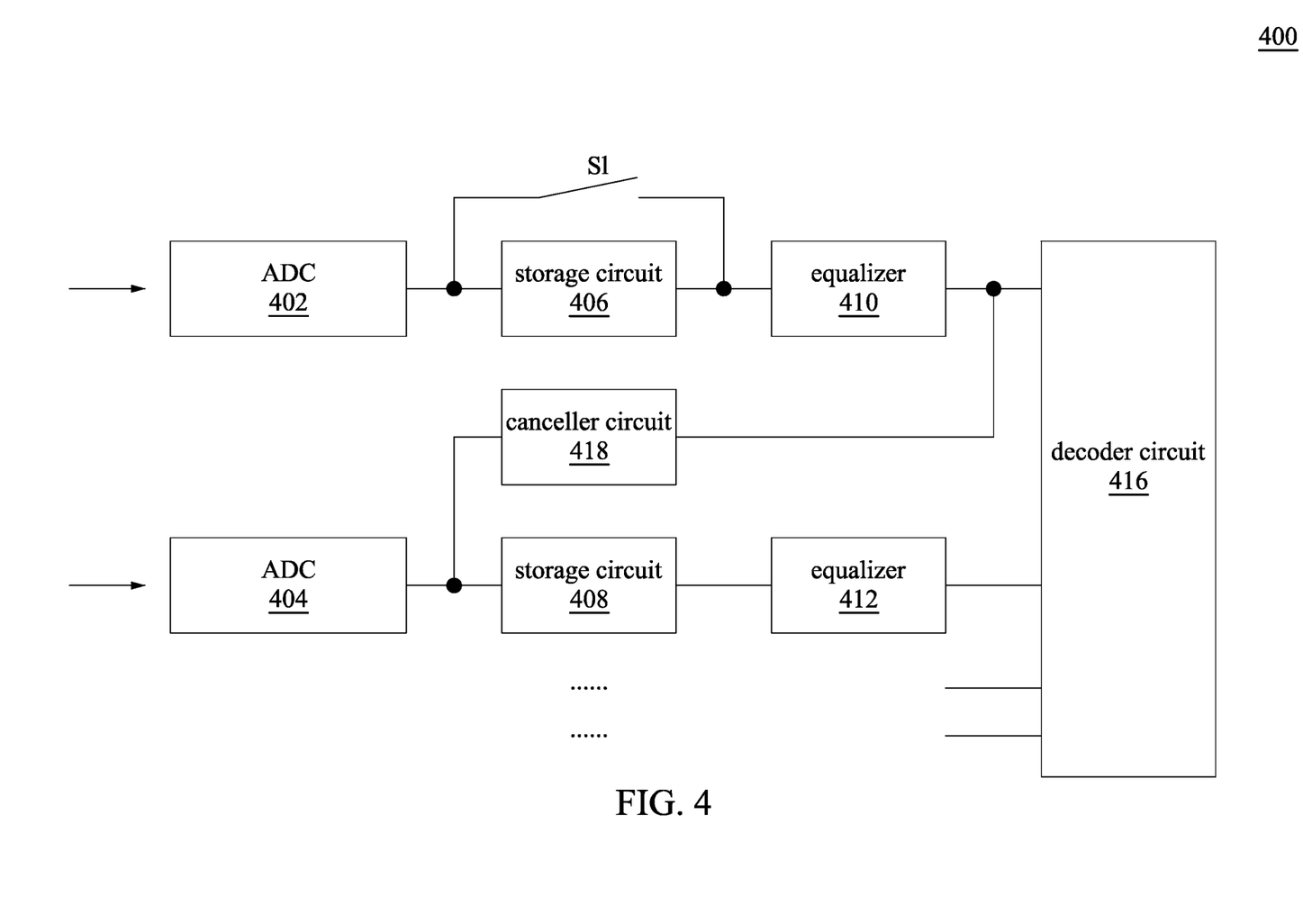
FIG. 4 is a schematic diagram illustrating a receiver device according to some embodiments of the present disclosure.

Reference is made to FIG. 4. FIG. 4 is a schematic diagram illustrating a receiver device 400 according to some embodiments of the present disclosure. In some embodiments, the receiver device 160 in FIG. 1 may be implemented by the receiver device 400, but the present disclosure is not limited thereto.

As illustrated in FIG. 4, the receiver device 400 includes an analog-to-digital converter 402, an analog-to-digital converter 404, a storage circuit 406, a storage circuit 408, an equalizer 410, an equalizer 412, a decoder circuit 416, a canceller circuit 418, and a switch S1. In some embodiments, the storage circuit 406 and the storage circuit 408 are implemented by data registers configured to perform the FIFO process. It is noted that the decoder circuit 416 in FIG. 4 is taken as an example and the decoder circuit 416 has four input paths. For ease of understanding, FIG. 4 merely shows two of the input paths, the other two paths and another canceller circuit connected between the first input path and the second input path are omitted.

The analog-to-digital converter 402 is configured to receive analog signals from a transmitter device and convert the analog signals into digital input data. The storage circuit 406 is coupled between the analog-to-digital converter 402 and the equalizer 410. The switch S1 is coupled between an input terminal of the storage circuit 406 and an output terminal of the storage circuit 406. The storage circuit 406 is configured to perform the FIFO process on input data from the analog-to-digital converter 402. Effectively, the storage circuit 406 can introduce delay time into the input data from the analog-to-digital converter 402. The equalizer 410 is coupled between the storage circuit 406 and the decoder circuit 416. The equalizer 410 is configured to perform an equalization process on data from the storage circuit 406 and transmit the equalized data to the decoder circuit 416 for subsequent decoding process. Similarly, the analog-to-digital converter 404 is configured to receive analog signals from a transmitter device and convert the analog signals into digital input data. The storage circuit 408 is coupled between the analog-to-digital converter 404 and the equalizer 412. Another one switch (not shown) is coupled between an input terminal of the storage circuit 408 and an output terminal of the storage circuit 408. The storage circuit 408 is configured to perform the FIFO process on input data from the analog-to-digital converter 404. In this manner, the storage circuit 408 can introduce delay time into the input data from the analog-to-digital converter 404. The equalizer 412 is coupled between the storage circuit 408 and the decoder circuit 416. The equalizer 412 is configured to perform an equalization process on data from the storage circuit 408 and transmit the equalized data to the decoder circuit 416 for subsequent decoding process.

The canceller circuit 418 is coupled between an output of the analog-to-digital converter 404 (the input terminal of the storage circuit 408) and an output terminal of the equalizer 410. In some embodiments, the canceller circuit 418 is implemented by a far-end-crosstalk (FEXT) canceller, but the present disclosure is not limited thereto. Based on the descriptions above, the decoder circuit 416 has the four input paths. Delay skew may be formed among these input paths. In other words, there are time differences among different input paths. When there are greater time differences among different input paths, the canceller circuit 418 cannot cancel the FEXT and the precursor 151 effectively. In a case that the transmission line is even longer, the effects caused by the time differences are more significant.

In some embodiments, the receiver device 400 performs operation S210 and operation S220 in FIG. 2 to perform the channel estimation process when the FIFO process has the maximum depth, so as to acquire the length of the transmission line coupled to the receiver device 400. The switch S1 is turned on or turned off based on the comparison result of comparing the length of the transmission line with the at least one length threshold value. For example, when the length of the transmission line is longer than the length threshold value, the switch S1 is turned off. Under this condition, the storage circuit 406 can introduce delay time into the input data from the analog-to-digital converter 402. Accordingly, it ensures that the canceller circuit 418 is able to cancel the FEXT and the precursor ISI. Specifically, in a case with longer transmission line, effects caused by the FEXT and the precursor 151 may become obvious, and more delay times are introduced to cancel these noises. On the contrary, when the transmission line has the length equal to or shorter than the length threshold value, the switch S1 is turned on. Under this condition, the input data from the analog-to-digital converter 402 can be transmitted to the equalizer 410 via a path of the switch S1 directly. In other words, the storage circuit 406 determines not to introduce delay time into the input data from the analog-to-digital converter 402. Accordingly, it can avoid introducing unnecessary delay time into the signal from the shorter transmission line and expedite the processing speed of the receiver device 400.

In some other embodiments, the delay time introduced by the storage circuit 406 is not a fixed value. The delay time introduced by the storage circuit 406 may be adjusted dynamically according to the comparison result of comparing the length of the transmission line with the length threshold value. It is noted that the operations of the other input paths of the decoder circuit 416 are similar and will not be described herein again.

Figure 5:
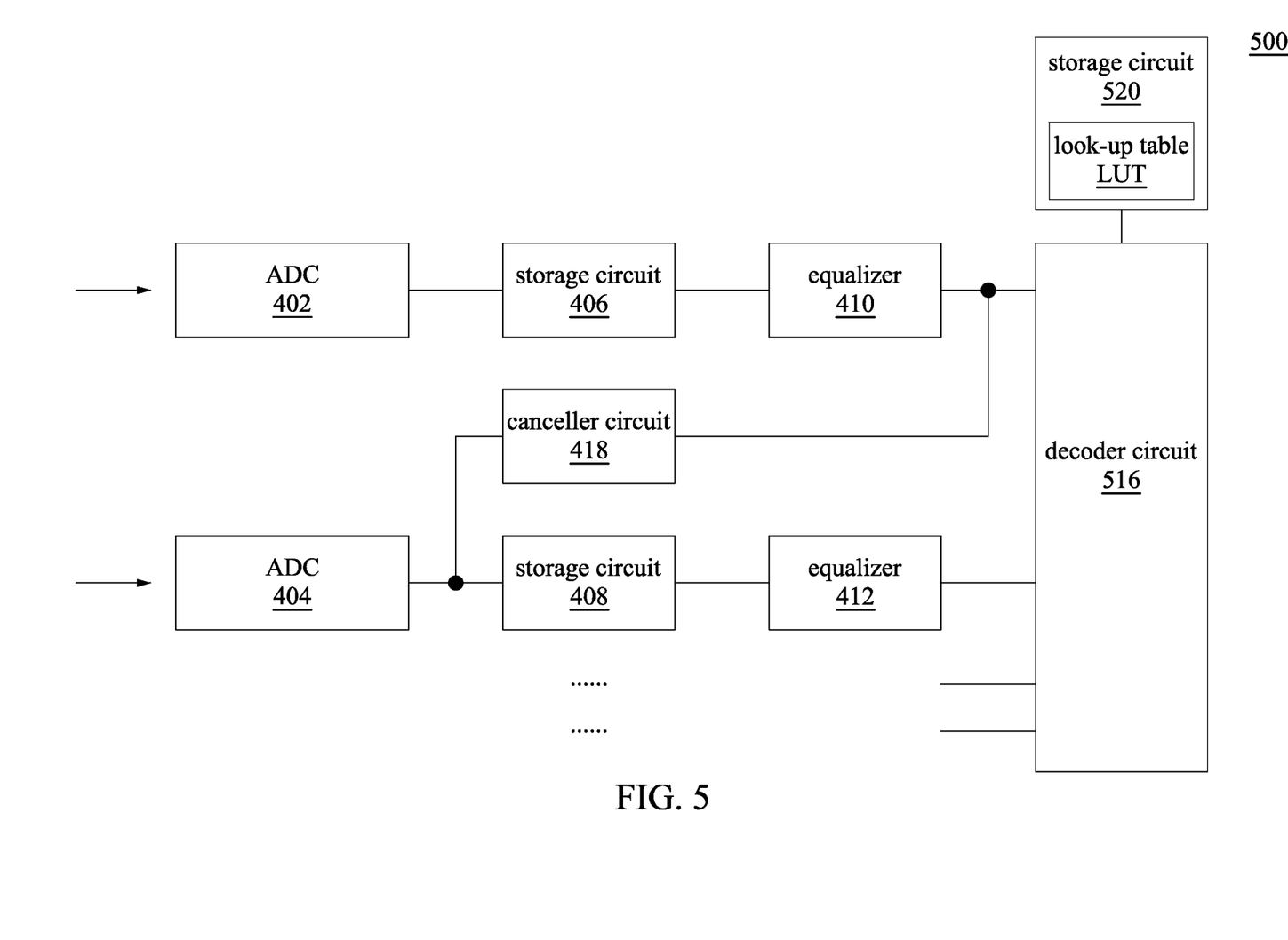
FIG. 5 is a schematic diagram illustrating a receiver device according to some embodiments of the present disclosure.

Reference is made to FIG. 5. FIG. 5 is a schematic diagram illustrating a receiver device 500 according to some embodiments of the present disclosure. A main difference between the receiver device 500 in FIG. 5 and the receiver device 400 is that, the receiver device 500 further includes a storage circuit 520. The storage circuit 520 is coupled to a decoder circuit 516. In some embodiments, the storage circuit 520 is implemented by, but not limited to, a register or a memory having a look-up table LUT stored therein.

In some embodiments, the decoder circuit 516 is implemented by a Viterbi decoder, but the present disclosure is not limited thereto. In some embodiments, the decoder circuit 516 traces back data with a specific time period. When the time period of tracing back is longer, the decoding accuracy of the decoder circuit 516 is higher. In addition, the depth of the FIFO process is longer than the time period of tracing back. However, in a case with shorter transmission lines, the decoder circuit 516 can shorten the time period of tracing back. Accordingly, the depth of the FIFO process can be shorten to avoid introducing unnecessary delay time into the signal from the shorter transmission line so that the processing speed of the receiver device 500 can be expedited.

Figure 6:
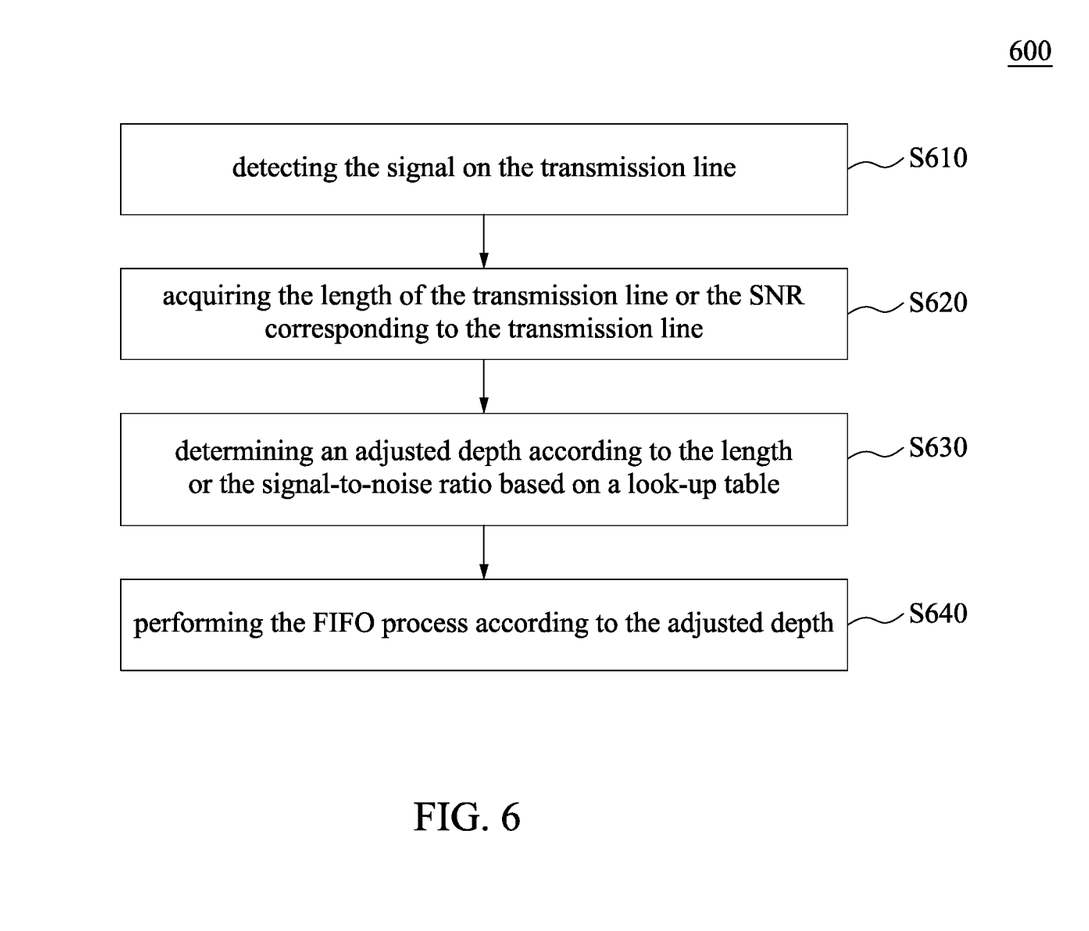
FIG. 6 is a flow diagram illustrating an operation method according to some embodiments of the present disclosure.

Reference is made to FIG. 6. FIG. 6 is a flow diagram illustrating an operation method 600 according to some embodiments of the present disclosure. The operation method 600 includes operations S610, S620, S630, and S640. In some embodiments, the operation method 600 is applied to the receiver device 500 in FIG. 5.

Operation S610 is detecting the signal on the transmission line. Operation S620 is acquiring the length of the transmission line or a signal-to-noise ratio (SNR) corresponding to the transmission line. In some embodiments, the receiver device 500 performs operation of S210 and operation S220 in FIG. 2 to execute the channel estimation process with the FIFO process having the maximum depth, so as to acquire the length of the transmission line coupled to the receiver device 500. In some embodiments, acquiring the signal-to-noise ratio corresponding to the transmission line may be established by detecting the signals on the transmission line with an auxiliary detector circuit.

Operation S630 is determining an adjusted depth according to the length of the transmission line or the signal-to-noise ratio corresponding to the transmission line based on the look-up table LUT. Operation S640 is performing the FIFO process according to the adjusted depth.

For example, the look-up table LUT may store mapping relationships between transmission line lengths and adjusted depths. The receiver device 500 can determine the adjusted depth and set the adjusted depth to be the depth of the FIFO process for subsequent data transmission based on the length of the transmission line and the look-up table LUT. For example, when the length of the transmission line is shorter, a shorter adjusted depth can be used to shorten the depth of the FIFO process.

In addition, since a shorter transmission line may have a higher signal-to-noise ratio, the depth of the FIFO process can be adjusted according to the signal-to-noise ratio as well. Accordingly, in some embodiments, the look-up table LUT stores mapping relationships between signal-to-noise ratios and adjusted depths. The receiver device 500 can determine the adjusted depth and set the FIFO process with the adjusted depth in the subsequent data transmission based on the signal-to-noise ratio of the transmission line and the look-up table LUT. For example, in a case with higher signal-to-noise ratio, a shorter adjusted depth can be used to shorten the depth of the FIFO process.

Based on the descriptions above, the receiver device 500 can adjust the depth of the FIFO process according to the length of the transmission line or the signal-to-noise ratio corresponding to the transmission line. Thus, it can avoid introducing unnecessary delay time into the signal from the shorter transmission line and expedite the processing speed of the receiver device 500.

The above description of the operation method 200 or operation method 600 includes exemplary operations, but the order of executing the operations of the operation method 200 or operation method 600 are not limited. The operation method 200 or operation method 600 disclosed in the present disclosure allows operation insertions, operation interchanges, or operation omits in accordance with the spirit and scope of various embodiments of the present disclosure. The operations are able to be executed simultaneously or partially simultaneously as appropriate in accordance with the spirit and scope of various embodiments of the present disclosure.

Based on the descriptions above, the receiver device and the operation method of the present disclosure can avoid introducing unnecessary delay time into the signal from the shorter transmission line and expedite the processing speed of the receiver device.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code to compile the script into a form that is used for the layout or fabrication of the ultimate circuitry.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An operation method implemented by a receiver device, wherein the operation method comprises:
    detecting a signal on a transmission line;
    performing a channel estimation to acquire a length of the transmission line;
    comparing the length with at least one length threshold value to generate a comparison result; and
    adjusting a depth of a first-in-first-out (FIFO) process performed by a storage circuit according to the comparison result.

2. The operation method of claim 1, further comprising:
    performing an initialization process to preset the depth as a maximum depth.

3. The operation method of claim 1, wherein adjusting the depth of the FIFO process comprises:
    reducing the depth if the length of the transmission line is shorter than the at least one length threshold value.

4. The operation method of claim 1, wherein detecting the signal on the transmission line comprises:
    detecting signal energy on the transmission line;
    determining whether the signal energy is greater than an energy threshold value; and
    performing the channel estimation if the signal energy is greater than the energy threshold value.

5. The operation method of claim 4, further comprising:
    continuing to detect the signal energy on the transmission line if the signal energy is lower than or equal to the energy threshold value.

6. The operation method of claim 1, wherein the transmission line is applied to an Ethernet system.

7. A receiver device, comprising:
    a decoder circuit;
    a first storage circuit configured to receive first input data and perform a FIFO process;
    a first equalizer coupled to the first storage circuit and the decoder circuit;
    a second storage circuit configured to receive second input data;
    a second equalizer coupled to the second storage circuit and the decoder circuit;
    a canceller circuit coupled to the first equalizer and the second storage circuit; and
    a switch coupled between an input terminal of the first storage circuit and an output terminal of the first storage circuit, wherein the switch is turned on or turned off based on a comparison result of comparing a length of a transmission line corresponding to the first input data with at least one length threshold value.

8. The receiver device of claim 7, wherein a channel estimation is performed when a preset length of the FIFO process is set to a maximum depth.

9. The receiver device of claim 7, wherein the switch is turned on if the comparison result indicates that the length of the transmission line is equal to or shorter than the at least one length threshold value.

10. The receiver device of claim 9, wherein the switch is turned off if the comparison result indicates that the length of the transmission line is longer than the at least one length threshold value.

11. The receiver device of claim 7, wherein the receiver device is applied to an Ethernet system.

12. The receiver device of claim 7, wherein a delay time of the first storage circuit is adjusted based on the comparison result.

13. An operation method implemented by a receiver device, wherein the operation method comprises:
    detecting a signal on a transmission line;
    acquiring a length of the transmission line or a signal-to-noise ratio corresponding to the transmission line;
    determining an adjusted depth according to the length or the signal-to-noise ratio based on a look-up table; and
    performing, by a storage circuit, a FIFO process according to the adjusted depth.

14. The operation method of claim 13, wherein the look-up table records a mapping relationship between at least one length and at least one adjusted depth.

15. The operation method of claim 13, further comprising:
　determining the signal-to-noise ratio according to the signal being detected on the transmission line.

16. The operation method of claim 15, wherein the look-up table records a mapping relationship between at least one signal-to-noise ratio and at least one adjusted depth.

17. The operation method of claim 13, wherein acquiring the length of the transmission line comprises:
　performing a channel estimation when a preset length of the FIFO process is set to a maximum depth, in order to acquire the length of the transmission line.

18. The operation method of claim 13, wherein the transmission line is applied to an Ethernet system.

* * * * *